United States Patent [19]

Rickenbach et al.

[11] Patent Number: 5,612,780
[45] Date of Patent: Mar. 18, 1997

[54] DEVICE FOR DETECTING LIGHT EMISSION FROM OPTICAL FIBER

[75] Inventors: Robert Rickenbach, Thousand Oaks; Ronald G. Boyer, Camarillo, both of Calif.

[73] Assignee: Harris Corporation, Melbourne, Fla.

[21] Appl. No.: 660,679

[22] Filed: Jun. 5, 1996

[51] Int. Cl.$^6$ .................................................. G01N 21/84
[52] U.S. Cl. ..................................... 356/73.1; 250/227.24; 385/94
[58] Field of Search ...................... 356/73.1; 250/227.24; 385/92, 94

[56] References Cited

U.S. PATENT DOCUMENTS

| | | | |
|---|---|---|---|
| 3,666,949 | 5/1972 | De Falco et al. | 250/227.11 X |
| 4,288,161 | 9/1981 | Fortescue | 356/73.1 X |

Primary Examiner—Vincent P. McGraw
Attorney, Agent, or Firm—Charles E. Wands

[57] ABSTRACT

A device for determining the presence of light in an optical fiber includes a housing having a light-receiving chamber. An aperture in a wall of the housing accommodates insertion of the fiber into the chamber. A brush-configured, light-blocking curtain is mounted adjacent to the aperture and has a plurality of bristles sized and arranged to allow an optical fiber to pass therebetween. A funnel-shaped light reflector is disposed in the chamber adjacent to the curtain and has a first relatively wide diameter opening at a forward end thereof and tapers to a second, relatively narrow diameter light-exiting opening at an apex thereof. An opto-electronic light detector is disposed adjacent to the narrow diameter opening of the funnel-shaped light reflector. Light emitted by an optical fiber that has been inserted through the bristles of the light-blocking curtain impinges upon the opto-electronic light detector. At the same time, the bristles effectively wrap around the fiber and prevent entry of ambient light into the interior of the chamber and onto the light detector. A signal processing circuit is coupled to the output of the light detector generates an output representative of the presence of light in the fiber in response to the measured amount of optical energy exceeding a prescribed threshold.

31 Claims, 2 Drawing Sheets

DEVICE FOR DETECTING LIGHT EMISSION FROM OPTICAL FIBER

FIELD OF THE INVENTION

The present invention relates in general to communication systems and test devices therefor, and is particularly directed to a reduced complexity optical fiber radiation test device for detecting the emission of light from the end of a light transmission medium, in particular an optical fiber.

BACKGROUND OF THE INVENTION

In the course of servicing or testing components of a fiber optic telecommunication system, such as identifying broken or disrupted optical fiber strands, or identifying active fibers of a fiber optic bundle that are to be connected to an opto-electronic receiver, it is often necessary for a craftsperson to determine whether one or more optical fibers of a fiber optic cable is 'dark' or 'lit', namely whether a fiber of interest is conducting light. Since light sources used for lightwave transmission may generate harmful laser radiation, and typically generate an output spectrum that falls within the infrared region (e.g., 780 nm through 1600 nm) that cannot be seen by the human eye, safety precautions must be taken, usually requiring special equipment.

For this purpose, technicians have conventionally used optical power meters to determine the presence or absence of light within a fiber. Unfortunately, optical power meters require that a fiber optic connector be installed on the end of the fiber to be checked. If such a connector is not installed, the craftsperson has nothing more than a bare fiber optic strand with which to work. Unless the end of the fiber is cleaved, light escaping the fiber may be skewed and may not be directed to the detector. As a consequence, before the fiber can be checked for the presence or absence of light, it must be fitted with an adapter to shield the optical detector from the incidence of ambient light (which contains infrared radiation). This procedure is time consuming and involves expensive equipment—the cost for a typical power meter and bare fiber adapter may be on the order of $600 or more.

SUMMARY OF THE INVENTION

In accordance with the present invention, this problem is successfully addressed by means of a new and improved optical radiation detection device, that is physically configured to readily receive or accommodate an optical fiber, regardless of the condition of the end of the fiber, and to provide for optical coupling of radiation present in the fiber to a light detector that remains completely shielded from the introduction of ambient light.

For this purpose, the optical fiber radiation detector device of the present invention comprises a funnel-shaped reflector, having a first relatively wide diameter opening into which a terminal portion of an optical transmission medium, such as an individual connectorized or bare optical fiber, or a bundle of fibers, is insertable, and a second, relatively narrow diameter light exiting opening at an apex of the funnel. An opto-electronic light detector is disposed adjacent to the narrow diameter opening of the light-reflecting funnel, and is operative to convert light that has been collected by the funnel into electrical current. The relatively wide diameter end of the funnel is sized so that it can accommodate either 'connectorized' fibers, bare fibers and/or ribbon fibers.

Rather than install a rigid mechanical shutter, such as a conventional electromechanical iris, razor blades or cloth, the present invention uses a brush-configured light curtain head, which is removably mounted to the test device adjacent to the wide diameter end of the light funnel. Removable mounting of the brush-configured light curtain head facilitates replacement of its bristles, which may weaken with use over time, and allows the detector window to be cleaned as part of regular maintenance.

The brush-configured light curtain is comprised of two or more layers of opaque whisker or hair-like bristles, that are sized and oriented generally orthogonally to the axis of the funnel and direction of insertion of a fiber through the brush curtain into the funnel. As a connector or fiber is being inserted, the individual bristles of the brush curtain move out of the way and then effectively 'wrap around' an inserted fiber. This readily allows one or more optical fibers to physically pass between the bristles into the interior of the light funnel, so that any light emitted from the inserted end of the optical transmission medium will be incident upon the interior reflective sidewall of the light funnel and directed thereby to the light detector. At the same time, the density, depth and crosswise arrangement of the light curtain bristles serve to block entry of ambient light external to the device into the interior of the funnel and onto the light detector.

Once a fiber has been inserted into through the light curtain and into the interior of the reflector funnel, the user operates a switch (presses a momentary closure button) to activate a photon signal processing circuit that is coupled to the output of the light detector. Activating this photon signal processing circuit resets and zeroes out the detector. When the button switch is released photon-stimulated current generated at the output of the light detector is integrated. If, within a prescribed period of time, e.g., approximately one to three seconds, the output of the integrator reaches a threshold value, an output signal is generated, for example by way of an audible tone and/or an LED indicator. After a predetermined delay for example, approximately three seconds, the unit turns itself OFF and is ready for another test.

As a non-limiting example, the light detector, per se, may comprise a semiconductor PIN (Positive Intrinsic Negative) diode which converts each incident photon into a proportional number of electrons. Other types of light detectors may be used, as well. The photon generated current is integrated into an energy-representative output voltage by means of a differential amplifier and a low leakage capacitor. The integrated voltage will build up in proportion to the amount of optical energy impinging upon the light detector. Measuring energy effectively eliminates noise and thus a false detection indication. Also, the complexity of the circuit is reduced by using only a single amplifier.

DETAILED DESCRIPTION

Figure 1:
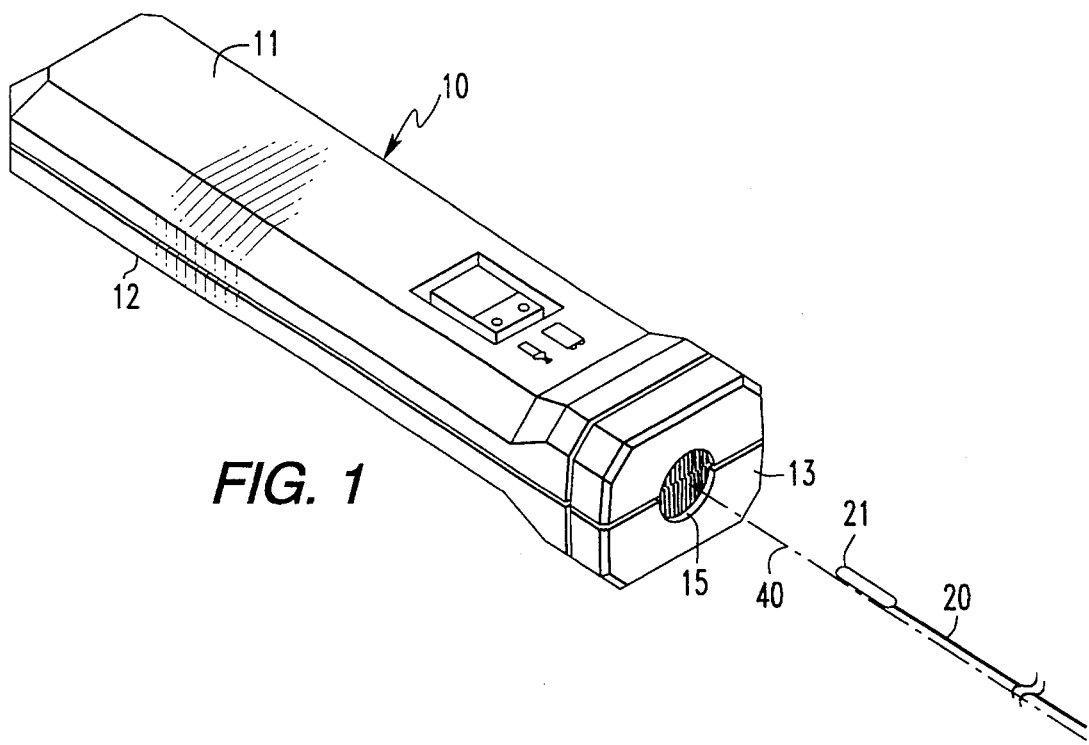
FIG. 1 is a diagrammatic perspective view of the physical configuration of an embodiment of the optical fiber radiation detection device of the present invention.

The physical configuration of an embodiment of the optical fiber radiation detection device of the present invention will now be described with reference to the diagrammatic perspective view of FIG. 1, and the top and side diagrammatic sectional views of FIGS. 2 and 3. As shown therein, the device has a generally elongate housing 10, sized to be held in a craftsperson's hand to facilitate its use. The housing 10 may be comprised of a pair of rigid plastic or metal casing halves or shells 11 and 12, which are joined together to form a sturdy light-tight enclosure. All components of the device, including optical, electronic and batteries are retained within the housing 10, proper.

The housing 10 includes a front wall 13, which has an aperture 15 that is sized to accommodate the insertion of an optical transmission medium, such as one or more connectorized fibers, bare fibers and/or ribbon fibers, shown at 20, into an interior light receiving and directing chamber 22. Disposed within the interior light receiving and directing chamber 22 is a funnel-shaped reflector 24, such as a conically shaped funnel of highly reflective metal (e.g. chrome) or having its interior surface 23 coated with a highly reflective material, such as chrome paint. The light reflective funnel 24 has a first relatively wide diameter opening 26 at a forward end thereof adjacent to aperture 15, which tapers to a second, relatively narrow diameter light-exiting opening 28 at an apex of the funnel-configured reflector 24. An opto-electronic light detector 29, such as a semiconductor PIN (Positive Intrinsic Negative) diode element is disposed adjacent to the narrow diameter opening 28 of the light-reflecting funnel 24, and is operative to convert light that has been collected by the reflective funnel into electrical current.

Disposed immediately behind the aperture 15 in front wall 13, and adjacent to the relatively wide diameter opening 26 of reflective funnel 24, are a plurality (e.g., two offset pairs) of brush-configured light curtain heads 30, 31 and 32, 33. These brush-configured light curtain heads are preferably configured to be removably mounted to housing 10 directly behind the aperture 15, and have the whisker-like bristles thereof overlap—for example, the bristles of curtain heads 30, 31 have the ends 35, 36 partially overlapping in a mutually axially offset, as shown in FIG. 2, and the bristles of curtain heads 32, 33 have the ends 37, 38 thereof disposed in abutting, end-to-end abutting relationship, as shown in FIG. 3. As pointed out above, removable mounting of the brush-configured light curtain heads 30, 31 and 32, 33 facilitates replacement of their bristles, which may weaken with use over time, and allows a detector window at the light-exiting opening 28 of the funnel to be cleaned as part of regular maintenance.

Figure 2:
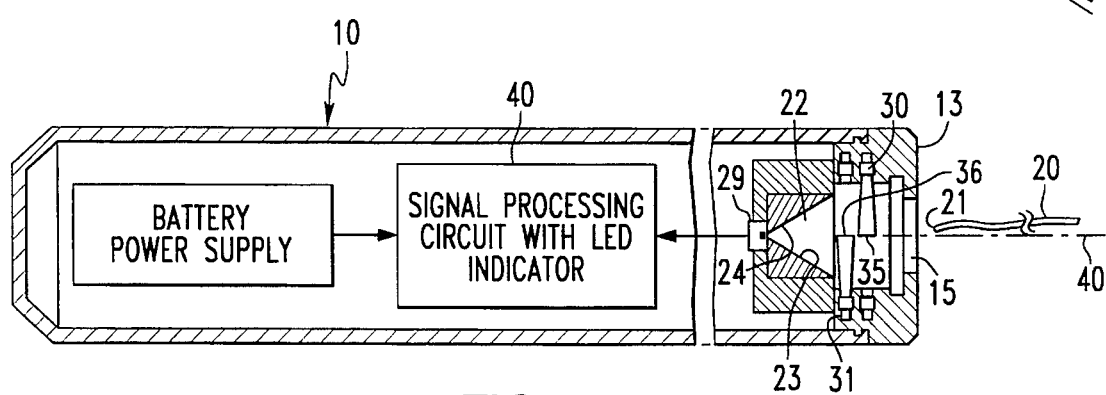
FIG. 2 is a diagrammatic top sectional view of the device of FIG. 1.
Figure 3:
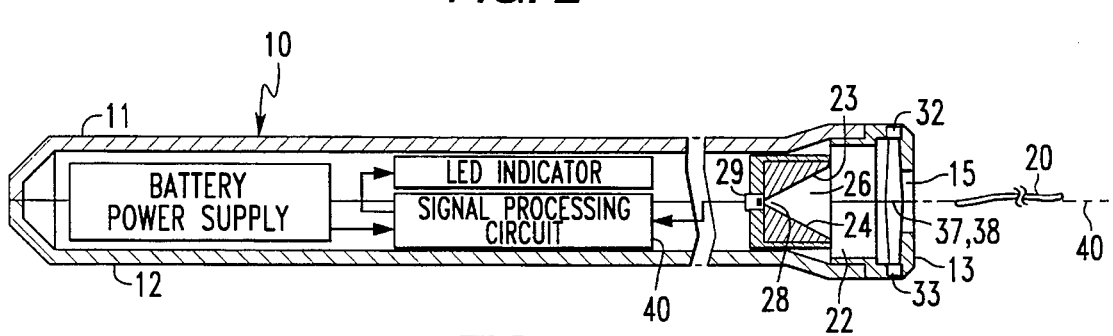
FIG. 3 is diagrammatic side sectional view of the device of FIG. 1.

Although the brush-configured light curtain of FIGS. 2 and 3 is shown as comprising two pairs of brush heads, each of which has a bundle of opaque (black) whisker or hair-like bristles, more or less than two pairs of heads may be installed as desired, as long as the overall effect of providing an ambient light-blocking entryway for an optical fiber is provided. In the non-limiting illustrated embodiment, the bristles of each head are oriented generally orthogonally to the axis 40 of the light-reflecting funnel 24, which effectively corresponds to the direction of insertion of a fiber 20 through the brush curtain heads 30, 31 and 32, 33 into the funnel 24. As a result, during insertion of a connector or fiber 20 through the brush-covered aperture 15, the individual bristles of the brush curtain heads move out of the way and then effectively 'wrap around' the fiber.

Namely, the brush-configured light curtain allows one or more optical fibers to physically pass between its bristles into the interior chamber 22 of the light funnel, so that any light emitted from the inserted end 21 of the optical fiber 20 will be incident upon the highly reflective interior sidewall 23 of the light funnel 24 and directed thereby through exit 28 onto the light detector 29. The opacity, density, depth and crosswise arrangement of the bundles of light curtain bristles 30, 31 and 32, 33 thus serve to block entry of ambient light external to light directing chamber 22 the device into the interior of the funnel and onto the light detector 28. Because the interior surface of the reflector 24 is tapered, e.g., curved or conically shaped, any light emitted from the end of an inserted fiber will be directed toward the funnel's exit aperture 28.

Figure 4:
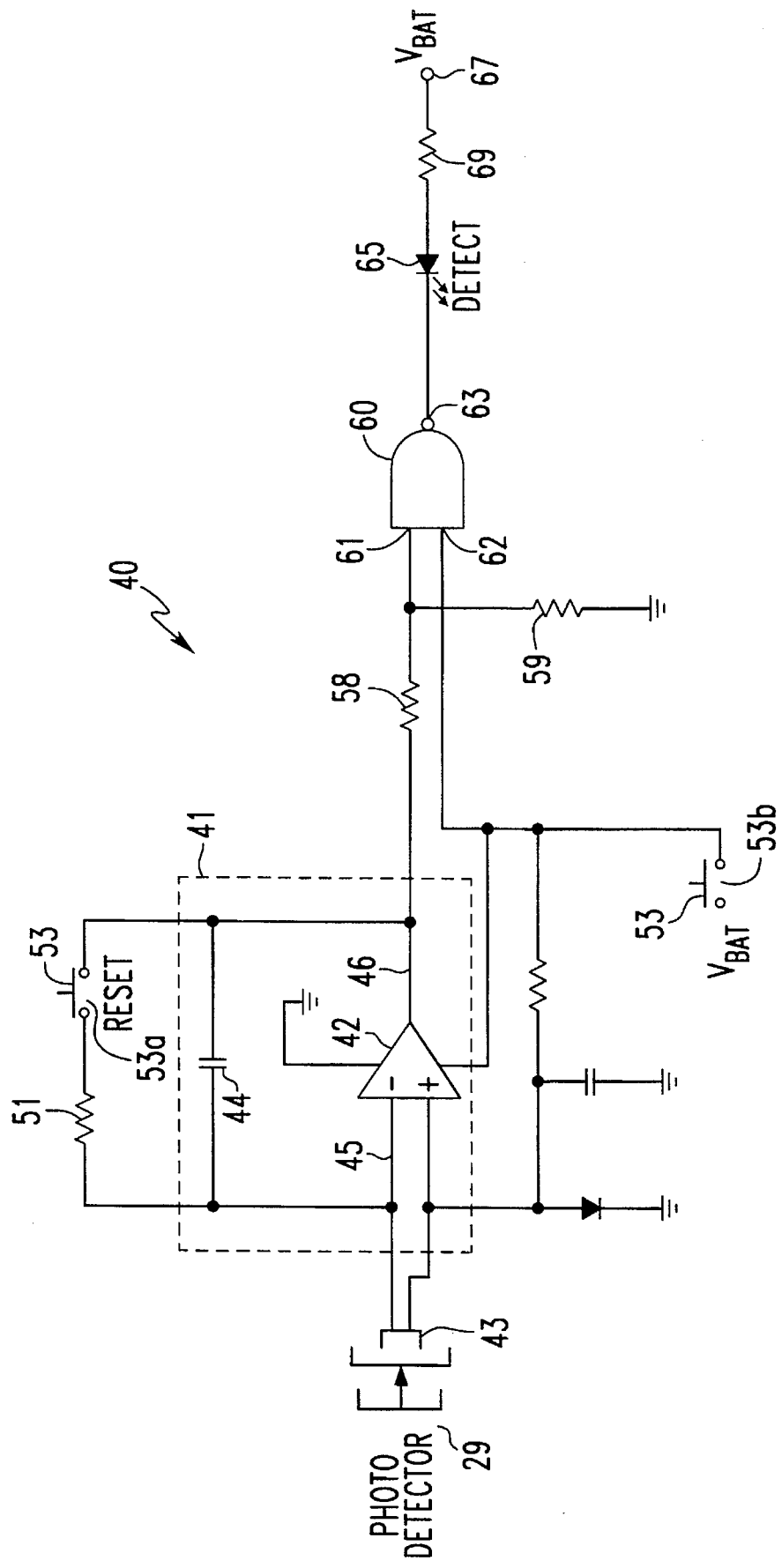
FIG. 4 schematically illustrates a signal processing circuit employed in the optical fiber radiation detection device of the present invention.

A signal processing circuit 40 which is coupled to the output of the light detector 29 is schematically illustrated in FIG. 4 as comprising an integrator 41 comprised of an operational amplifier 42 having differential (+) and (−) inputs thereof connected via a connector 43 across PIN diode detector 29. An integrating, low leakage capacitor 44 is coupled between the output 46 and the negative (−) input 45 of the amplifier. A series connection of a resistor 51 and switch contacts 53a of a momentary single-pole, double-throw pushbutton switch 53 are coupled in parallel with capacitor 44. The second (+) input of differential amplifier 42 is coupled to grounded diode 47 and capacitor 48, and through resistor 49 to output 46.

The output 46 of integrator 41 is coupled through a voltage divider 57 comprised of a series connection of resistors 58 and 59 to ground to a first input 61 of a NAND gate 60. A second input 62 of NAND gate 60 is coupled through switch contacts 53b of switch 53 to receive the battery power voltage $V_{BAT}$ (e.g., 6 V to 9 V) and also enables logic gate 62. The output 63 of NAND gate 60 is coupled to an output device, such as a light emitting diode 65 or audible alarm device, not shown, which is biased by a power supply input from a $V_{BAT}$ terminal 67, coupled through a resistor 69.

In operation, as light-detecting PIN photodiode 29 detects incident photons directed thereon by reflective funnel 24, it produces an output current whose magnitude is proportional to the number of photons. This photon-generated output current from PIN diode 29 is integrated into an energy-representative output voltage by differential amplifier 42 and capacitor 44. Thus, the integrated output voltage produced at the output of amplifier 42 will increase in proportion to the amount of optical energy impinging upon the light detecting diode 29. Since optical energy is measured rather than power, noise and false detection are effectively eliminated, as described above.

With an optical fiber 20 inserted into the light chamber 22 through the bristles of the brush-configured light curtain, the craftsperson operates momentary closure pushbutton switch 53, which discharges integrating capacitor 44 and thereby resets (zeroes out) the integrator 41. When the pushbutton switch 53 is released, photon-stimulated current generated by light-detecting PIN diode 29 begins to be integrated. If, within a prescribed period of time, e.g., approximately one to three seconds, the output of the integrator reaches a threshold logic level, sufficient to change the state of NAND gate 60, the output 63 of NAND gate 60 changes state, thereby turning on light emitting diode 55 or supplying a control input to another type of indication element, such as an audible alarm device. After a predetermined delay for example, approximately three seconds, the feedback connection to the input of integrator 41 changes the state of its output and turns the output indicator device OFF in preparation for testing another optical fiber.

As will be appreciated from the foregoing description, the above discussed need for a relatively inexpensive and reduced complexity device that for determining the presence or absence of light within an optical fiber (particularly where the light may be invisible to the human eye, falling in the infrared region) is successfully achieved in accordance with the present invention, which employs a brush-configured light blocking curtain in combination with a light-reflecting funnel, which physically accommodates an optical fiber, to provide optical coupling of radiation present in the fiber to a light detector, while simultaneously shielding the photodetector from the introduction of ambient light.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A device for detecting whether an optical transmission medium is transmitting light comprising:

a light detector;

a light-collecting reflector which directs light impinging thereon to said light detector; and a brush-configured light curtain disposed adjacent to said light-collecting reflector and being configured to allow said optical transmission medium to pass therethrough and impinge upon said light-collecting reflector, so that light emitted from said optical transmission medium is directed by said light-collecting reflector to said light detector, while preventing entry of ambient light through said curtain.

2. A device according to claim 1, wherein brush bristles of said light curtain are oriented generally orthogonally with respect to the direction of insertion of said optical transmission medium into said light-collecting reflector.

3. A device according to claim 1, wherein said light-collecting reflector is generally funnel-shaped.

4. A device according to claim 3, wherein said generally funnel-shaped light-collecting reflector has a first, relatively wide diameter opening into which a terminal portion of said optical transmission medium is insertable, and a second, relatively narrow diameter opening at an apex of said generally funnel-shaped light-collecting reflector, said light detector being disposed adjacent to said narrow diameter opening of said generally funnel-shaped light-collecting reflector.

5. A device according to claim 1, wherein said optical transmission medium comprises one or more optical fibers.

6. A device according to claim 5, wherein said brush-configured light curtain has a plurality of bristles that are sized and oriented to allow said one or more optical fibers to physically pass therethrough into said light-collecting reflector, while blocking entry of ambient light external to said device into said light-collecting reflector and onto said light detector.

7. A device according to claim 6, wherein said light-collecting reflector is generally funnel-shaped.

8. A device according to claim 1, wherein said light detector is operative to measure the amount of optical energy emitted by said optical transmission medium inserted through said curtain into said light-collecting reflector and to generate an output in response to the measured amount of optical energy emitted by said optical transmission medium exceeding a prescribed threshold.

9. A device according to claim 8, wherein said light detector is configured to be resetable to a base energy level prior to measuring optical energy emitted by said optical transmission medium.

10. A device according to claim 1, wherein said light detector is operative to detect light in a spectral range that is visible to the human eye.

11. A device according to claim 7, wherein said brush-configured light curtain has a plurality of bristles that are sized and oriented to allow said one or more optical fibers to physically pass therethrough into said generally funnel-shaped, light-collecting reflector, while blocking entry of ambient light external to said device.

12. A device according to claim 1, wherein said light detector is operative to detect light in a spectral range not visible to the human eye.

13. A device according to claim 12, wherein said spectral range includes infrared light.

14. A device according to claim 11, wherein said brush-configured, light-blocking curtain includes a plurality of brush-configured light-blocking curtain heads removably mounted adjacent to said generally funnel-shaped light reflector and having whisker-like bristles that are arranged in overlapping relationship and oriented generally orthogonally to the direction of insertion of said optical transmission medium through bristles of said brush-configured, light-blocking curtain heads into said generally funnel-shaped light reflector.

15. A method of detecting the presence or absence of light in an optical fiber comprising the steps of:

(a) providing a generally funnel-configured light reflector having a relatively wide opening at a first end thereof and a relatively narrow opening at a second end thereof;

(b) disposing a light detector adjacent to said relatively narrow opening of said light reflector; and (c) introducing said optical fiber into said relatively wide opening at said first end of said generally funnel-configured light reflector while blocking the incidence of ambient light upon said light detector, by disposing a brush-configured, light-blocking curtain adjacent to said relatively wide opening at said first end of said generally funnel-configured light reflector, and inserting said optical fiber between bristles of said light-blocking curtain, so that an end of said optical fiber is exposed to said light reflector, while bristles of said brush-configured, light-blocking curtain effectively wrap around said inserted fiber, and prevent the entry of ambient light into the interior of the funnel and onto said light detector.

16. A method according to claim 15, wherein bristles of said brush-configured light-blocking curtain are oriented generally orthogonally with respect to the direction of insertion of said optical fiber into said light funnel.

17. A method according to claim 15, wherein step (c) further includes processing an electrical current signal produced by said light detector so as to measure the amount of optical energy emitted by said optical fiber inserted between bristles of said brush-configured, light-blocking curtain into said light funnel, and generating an output representative of the presence of light in said optical fiber in response to the measured amount of optical energy emitted by said optical fiber exceeding a prescribed threshold.

18. A method according to claim 15, wherein said light detector is operative to detect light in a spectral range that includes light that is visible and not-visible to the human eye.

19. A method according to claim 18, wherein said spectral range includes infrared light.

20. A device for detecting the presence or absence of light in an optical transmission medium comprising:

a housing having a light-receiving and directing chamber, and an aperture in a wall of said housing that is sized to accommodate the insertion of said optical transmission medium therethrough into said chamber;

an opto-electronic light detector disposed in said chamber and being operative to convert light emitted by a portion of said optical transmission medium inserted into said chamber into electrical current;

a brush-configured, light-blocking curtain adjacent to said aperture having a plurality of bristles that are sized and arranged to allow said optical transmission medium inserted through said aperture to pass between said bristles, so that light emitted by said portion of said optical transmission medium inserted into said chamber impinges upon said opto-electronic light detector, while bristles of said brush-configured, light-blocking curtain effectively wrap around said inserted optical transmission medium, and prevent the entry of ambient light into the interior of said chamber and onto said light detector; and a signal processing circuit coupled to the output of said light detector and being operative to measure the amount of optical energy emitted by said optical transmission medium inserted between bristles of said brush-configured, light-blocking curtain into said chamber.

21. A device according to claim 20, wherein said signal processing circuit includes a threshold detector circuit that is operative to generate an output representative of the presence of light in said optical transmission medium in response to the measured amount of optical energy emitted by said optical transmission medium exceeding a prescribed threshold.

22. A device according to claim 20, further including a funnel-shaped light reflector disposed in said chamber and having a first relatively wide diameter opening at a forward end thereof adjacent to said brush-configured, light-blocking curtain, said funnel-shaped light reflector tapering to a second, relatively narrow diameter light-exiting opening at an apex of said funnel-shaped reflector, and wherein said opto-electronic light detector is disposed adjacent to said narrow diameter opening of said funnel-shaped light reflector.

23. A device according to claim 20, wherein said brush-configured, light-blocking curtain includes a plurality of brush-configured light-blocking curtain heads removably mounted to said housing directly behind said aperture and having whisker-like bristles that are arranged in overlapping relationship and oriented generally orthogonally to the direction of insertion of said optical transmission medium through bristles of said brush-configured, light-blocking curtain heads into said chamber.

24. A device according to claim 23, wherein said plurality of brush-configured light-blocking curtain heads are arranged adjacent to said aperture so that bristles thereof are partially overlapping and mutually offset in said direction.

25. A device according to claim 23, wherein said plurality of brush-configured light-blocking curtain heads are arranged adjacent to said aperture so that bristles thereof are in end-to-end abutting relationship.

26. A device according to claim 22, wherein said funnel-shaped light reflector has a conical or curved shape, thereby directing light emitted from said optical transmission medium toward said light-exiting opening at said apex of said funnel-shaped reflector, and onto said opto-electronic light detector.

27. A device according to claim 20, wherein said signal processing circuit includes a pushbutton switch coupled in circuit with said threshold detector circuit and being operative to controllably reset said threshold detector circuit prior to measuring the presence of light in said optical transmission medium.

28. A utility device comprising a housing having a chamber, and an aperture in a wall of said housing that is sized to accommodate the insertion of a medium therethrough into said chamber, and a brush-configured, light-blocking curtain disposed adjacent to said aperture having a plurality of bristles that are sized and arranged to allow said medium to be inserted through said aperture and to pass between said bristles, as said bristles of said brush-configured, light-blocking curtain effectively abut against said inserted medium and prevent the entry of ambient light into said chamber.

29. A utility device according to claim 28, wherein said medium comprises an optical transmission medium and further including an opto-electronic light detector disposed in said chamber and being operative to convert light emitted by a portion of said optical transmission medium inserted into said chamber into an electrical output.

30. A utility device according to claim 29, further including a light-collecting reflector which is disposed in said chamber and is configured to direct light emitted from said optical transmission medium and impinging thereon to said opt-electronic light detector.

31. A utility device according to claim 30, wherein said light-collecting reflector comprises a generally funnel-shaped light reflector having a first relatively wide diameter opening at a forward end thereof adjacent to said brush-configured, light-blocking curtain, said generally funnel-shaped light reflector tapering to a second, relatively narrow diameter light-exiting opening at an apex of said generally funnel-shaped reflector, and wherein said opto-electronic light detector is disposed adjacent to said narrow diameter opening of said generally funnel-shaped light reflector.

* * * * *